United States Patent
Nelson

(10) Patent No.: US 11,075,799 B2
(45) Date of Patent: *Jul. 27, 2021

(54) SYSTEM AND METHOD FOR PROVISIONING IN A MULTI-TENANT APPLICATION SERVER ENVIRONMENT

(71) Applicant: ORACLE INTERNATIONAL CORPORATION, Redwood Shores, CA (US)

(72) Inventor: Laird Nelson, Bainbridge Island, WA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/112,233

(22) Filed: Aug. 24, 2018

(65) Prior Publication Data

US 2019/0068440 A1    Feb. 28, 2019

Related U.S. Application Data

(60) Provisional application No. 62/549,793, filed on Aug. 24, 2017.

(51) Int. Cl.
*H04L 12/24*   (2006.01)
*H04L 29/08*   (2006.01)
(Continued)

(52) U.S. Cl.
CPC ............ *H04L 41/0806* (2013.01); *G06F 9/48* (2013.01); *G06F 9/5077* (2013.01); *H04L 41/0893* (2013.01); *H04L 67/10* (2013.01)

(58) Field of Classification Search
CPC .. H04L 41/0806; H04L 41/0893; H04L 67/10; G06F 9/48; G06F 9/5077
See application file for complete search history.

(56) References Cited

U.S. PATENT DOCUMENTS 8,326,876 B1   12/2012   Venkataraman et al.
8,650,299 B1    2/2014   Huang et al.
(Continued)

FOREIGN PATENT DOCUMENTS

CN    101639835    2/2010
CN    102170457    8/2011
(Continued)

OTHER PUBLICATIONS

International Search Report and the Written Opinion of the International Searching Authority dated Jan. 5, 2016 for PCT Application No. PCT/US2015/052462, 14 pages.
(Continued)

*Primary Examiner* — Christopher B Robinson
(74) *Attorney, Agent, or Firm* — Tucker Ellis LLP

(57) ABSTRACT

In accordance with various embodiments, described herein are systems and methods for use with a multi-tenant application server environment, that support provisioning of domain partitions for use with software applications, including the provisioning of partitions with required components. Provisioning requests that are received at a lifecycle manager, and that specify the provisioning of a particular partition, can be communicated to a provisioning framework, for use in provisioning the partition, including where appropriate, the use of component-specific handlers that recognize partition provisioning events or control actions such as, for example, copying files, executing scripts, or updating configurations.

18 Claims, 8 Drawing Sheets

(51) Int. Cl.
*G06F 9/48* (2006.01)
*G06F 9/50* (2006.01)

(56) References Cited

U.S. PATENT DOCUMENTS

| | | | |
|---|---|---|---|
| 9,560,166 B2* | 1/2017 | Alam | H04L 41/22 |
| 9,626,271 B2 | 4/2017 | Karpuram et al. | |
| 10,055,219 B1 | 8/2018 | Olderdissen et al. | |
| 10,084,723 B2 | 9/2018 | Mordani et al. | |
| 10,469,401 B2 | 11/2019 | Mordani et al. | |
| 10,855,620 B2 | 12/2020 | Mordani et al. | |
| 2003/0074426 A1 | 4/2003 | Dervin et al. | |
| 2005/0235248 A1* | 10/2005 | Victoria | G06F 8/73 |
| | | | 717/102 |
| 2006/0036715 A1* | 2/2006 | Ghattu | H04L 67/125 |
| | | | 709/220 |
| 2007/0055781 A1 | 3/2007 | Fleischer et al. | |
| 2008/0022380 A1 | 1/2008 | Lu et al. | |
| 2009/0144720 A1 | 6/2009 | Roush et al. | |
| 2009/0187899 A1 | 7/2009 | Mani et al. | |
| 2009/0241100 A1 | 9/2009 | Sakurai et al. | |
| 2009/0300093 A1 | 12/2009 | Griffiths et al. | |
| 2010/0162226 A1 | 6/2010 | Borissov et al. | |
| 2011/0125894 A1* | 5/2011 | Anderson | G06F 21/31 |
| | | | 709/224 |
| 2011/0213870 A1 | 9/2011 | Cai et al. | |
| 2011/0320574 A1* | 12/2011 | Felts | G06F 9/44505 |
| | | | 709/220 |
| 2011/0321031 A1 | 12/2011 | Dournov et al. | |
| 2012/0030168 A1 | 2/2012 | Weissenberger et al. | |
| 2012/0054732 A1 | 3/2012 | Jain et al. | |
| 2012/0072597 A1* | 3/2012 | Teather | G06F 9/5072 |
| | | | 709/226 |
| 2012/0102480 A1 | 4/2012 | Hopmann et al. | |
| 2012/0131101 A1 | 5/2012 | Said et al. | |
| 2013/0067493 A1 | 3/2013 | Dion et al. | |
| 2013/0232497 A1* | 9/2013 | Jalagam | G06F 8/61 |
| | | | 718/104 |
| 2013/0326494 A1 | 12/2013 | Nunez | |
| 2014/0075021 A1 | 3/2014 | Revanuru | |
| 2014/0075565 A1 | 3/2014 | Srinivasan et al. | |
| 2014/0136712 A1* | 5/2014 | Kim | H04L 47/70 |
| | | | 709/226 |
| 2014/0173566 A1 | 6/2014 | Hsu et al. | |
| 2014/0280975 A1 | 9/2014 | Mordani et al. | |
| 2014/0344337 A1 | 11/2014 | Sramka et al. | |
| 2015/0207758 A1 | 7/2015 | Mordani et al. | |
| 2015/0295844 A1 | 10/2015 | Perreira et al. | |
| 2015/0296030 A1* | 10/2015 | Maes | G06F 9/5072 |
| | | | 715/736 |
| 2015/0370549 A1 | 12/2015 | Zhang et al. | |
| 2015/0370608 A1 | 12/2015 | Dipol et al. | |
| 2015/0372883 A1 | 12/2015 | Lam et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0373117 A1 | 12/2015 | Gleyzer et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1 | 1/2016 | Thyagarajan et al. | |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094405 A1 | 3/2016 | Barnes et al. | |
| 2016/0094406 A1 | 3/2016 | Phan et al. | |
| 2016/0094407 A1 | 3/2016 | Parkinson et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094478 A1 | 3/2016 | Quinn et al. | |
| 2016/0094484 A1 | 3/2016 | Mordani et al. | |
| 2016/0094486 A1 | 3/2016 | Sahoo et al. | |
| 2016/0094498 A1 | 3/2016 | Xiao et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1 | 3/2016 | Mordani et al. | |
| 2016/0094625 A1 | 3/2016 | Sengodan et al. | |
| 2016/0094626 A1 | 3/2016 | Bajaj et al. | |
| 2016/0094627 A1 | 3/2016 | Subramanyam et al. | |
| 2016/0094635 A1 | 3/2016 | Kannan et al. | |
| 2016/0094647 A1 | 3/2016 | Mordani et al. | |
| 2016/0142506 A1 | 5/2016 | Sahoo et al. | |
| 2016/0231998 A1 | 8/2016 | Islam et al. | |
| 2016/0285694 A1 | 9/2016 | Maes | |
| 2016/0328268 A1 | 11/2016 | Islam et al. | |
| 2016/0350102 A1 | 12/2016 | Karpuram et al. | |
| 2016/0378453 A1 | 12/2016 | Kalidindi et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0142228 A1 | 5/2017 | Byrne et al. | |
| 2017/0192772 A1 | 7/2017 | Islam et al. | |
| 2017/0222910 A1 | 8/2017 | Cai et al. | |
| 2018/0026849 A1 | 1/2018 | Guim Bernat et al. | |
| 2019/0014060 A1 | 1/2019 | Mordani et al. | |

FOREIGN PATENT DOCUMENTS

| | | |
|---|---|---|
| CN | 102333115 | 1/2012 |
| CN | 102571821 | 7/2012 |
| CN | 102571916 | 7/2012 |
| CN | 102609271 | 7/2012 |
| CN | 102932404 | 2/2013 |
| CN | 102932405 | 2/2013 |
| CN | 103455512 | 12/2013 |
| JP | 2006511100 | 3/2006 |
| JP | 2009282777 | 12/2009 |
| JP | 2014524608 | 9/2014 |
| WO | 2012063301 | 5/2012 |
| WO | 2014007813 | 1/2014 |
| WO | 2014039892 | 3/2014 |
| WO | 2014039918 | 3/2014 |

OTHER PUBLICATIONS

Chinese Patent Office, Office Action dated Jul. 20, 2018 for Chinese Patent Application No. 201580003512.6, 8 pages.
United States Patent and Trademark Office, Office Action dated Nov. 2, 2018 for U.S. Appl. No. 15/706,233, 25 pages.
European Patent Office, Communication pursuant to Article 94(3) EPC dated Apr. 23, 2019 for EP Application No. 15704133.6, 4 pages.
Japanese Patent Office, Office Action dated Jun. 4, 2019 for Japanese Patent Application No. 2017-516338, 6 pages.
United States Patent and Trademark Office, Notice of Allowance dated Aug. 9, 2019 for U.S. Appl. No. 15/948,721, 18 pages.
European Patent Office, Communication pursuant to Article 94(3) EPC dated Nov. 6, 2019 for EP Application No. 15781215.7, 7 pages.
United States Patent and Trademark Office, Notice of Allowance dated Dec. 16, 2019 for U.S. Appl. No. 15/948,721, 18 pages.
Chinese Patent Office, Office Action dated Jan. 20, 2020 for Chinese Patent Application No. 201580051600.3, 7 pages.

(56) References Cited

OTHER PUBLICATIONS

Indian Patent Office, First Examination Report dated Jun. 22, 2020 for Indian Patent Application No. 201647017709, 6 pages.
Chinese Patent Office, Office Action dated Jun. 23, 2020 for Chinese Patent Application No. 201580051600.3, 3 pages.
Indian Patent Office, First Examination Report dated Jul. 10, 2020 for Indian Patent Application No. 201747014022, 6 pages.

* cited by examiner

SYSTEM AND METHOD FOR PROVISIONING IN A MULTI-TENANT APPLICATION SERVER ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CLAIM OF PRIORITY

This application claims the benefit of priority to U.S. Provisional Patent Application titled "SYSTEM AND METHOD FOR SUPPORTING JRF PROVISIONING IN A MULTITENANT ENVIRONMENT", Application No. 62/549,793, filed Aug. 24, 2017; and is related to U.S. Patent Application titled "SYSTEM AND METHOD FOR PROVIDING END TO END LIFECYCLE IN A MULTI-TENANT APPLICATION SERVER ENVIRONMENT", application Ser. No. 14/864,725, filed Sep. 24, 2015; and U.S. Patent Application titled "SYSTEM AND METHOD FOR DATABASE AND APPLICATION SERVER LIFECYCLE PLUGINS IN A MULTITENANT APPLICATION SERVER ENVIRONMENT", application Ser. No. 14/864,719, filed Sep. 24, 2015; each of which above applications are herein incorporated by reference.

FIELD OF INVENTION

Embodiments of the invention are generally related to multi-tenant application server environments, and are particularly related to systems and methods for provisioning domain partitions for use with software applications in such environments.

BACKGROUND

In an application server environment which supports the use of domains within which software applications are executed, the provisioning of such domains can be handled automatically by provisioning tools that enable the copying of resources, supply of credentials, running of custom code, or other provisioning activities. However, in a multi-tenant application server environment, in which a domain may be partitioned for use by multiple tenants, resources such as external systems or other components required for a particular partition must be provisioned properly in order to support that partition.

SUMMARY

In accordance with various embodiments, described herein are systems and methods for use with a multi-tenant application server environment, that support provisioning of domain partitions for use with software applications, including the provisioning of partitions with required components. Provisioning requests that are received at a lifecycle manager, and that specify the provisioning of a particular partition, can be communicated to a provisioning framework, for use in provisioning the partition, including where appropriate, the use of component-specific handlers that recognize partition provisioning events or control actions such as, for example, copying files, executing scripts, or updating configurations.

DETAILED DESCRIPTION

As described above, in an application server environment which supports the use of domains within which software applications are executed, the provisioning of such domains can be handled automatically by provisioning tools that enable the copying of resources, supply of credentials, running of custom code, or other provisioning activities. However, in a multi-tenant application server environment, in which a domain may be partitioned for use by multiple tenants, resources such as external systems or other components required for a particular partition must be provisioned properly in order to support that partition.

In an Oracle environment, examples of such components may include Java Required Files (JRF) components, which are generally not included in the application server (e.g., WebLogic Server) installation itself, but instead provide a common functionality for use by various enterprise applications, e.g., Oracle business applications, and application frameworks.

In accordance with various embodiments, described herein are systems and methods for use with a multi-tenant application server environment, that support provisioning of domain partitions for use with software applications, including the provisioning of partitions with required components. Provisioning requests that are received at a lifecycle manager, and that specify the provisioning of a particular partition, can be communicated to a provisioning framework, for use in provisioning the partition, including where appropriate, the use of component-specific handlers that recognize partition provisioning events or control actions such as, for example, copying files, executing scripts, or updating configurations.

Application Server (e.g., Multi-Tenant, MT) Environment

Figure 1:
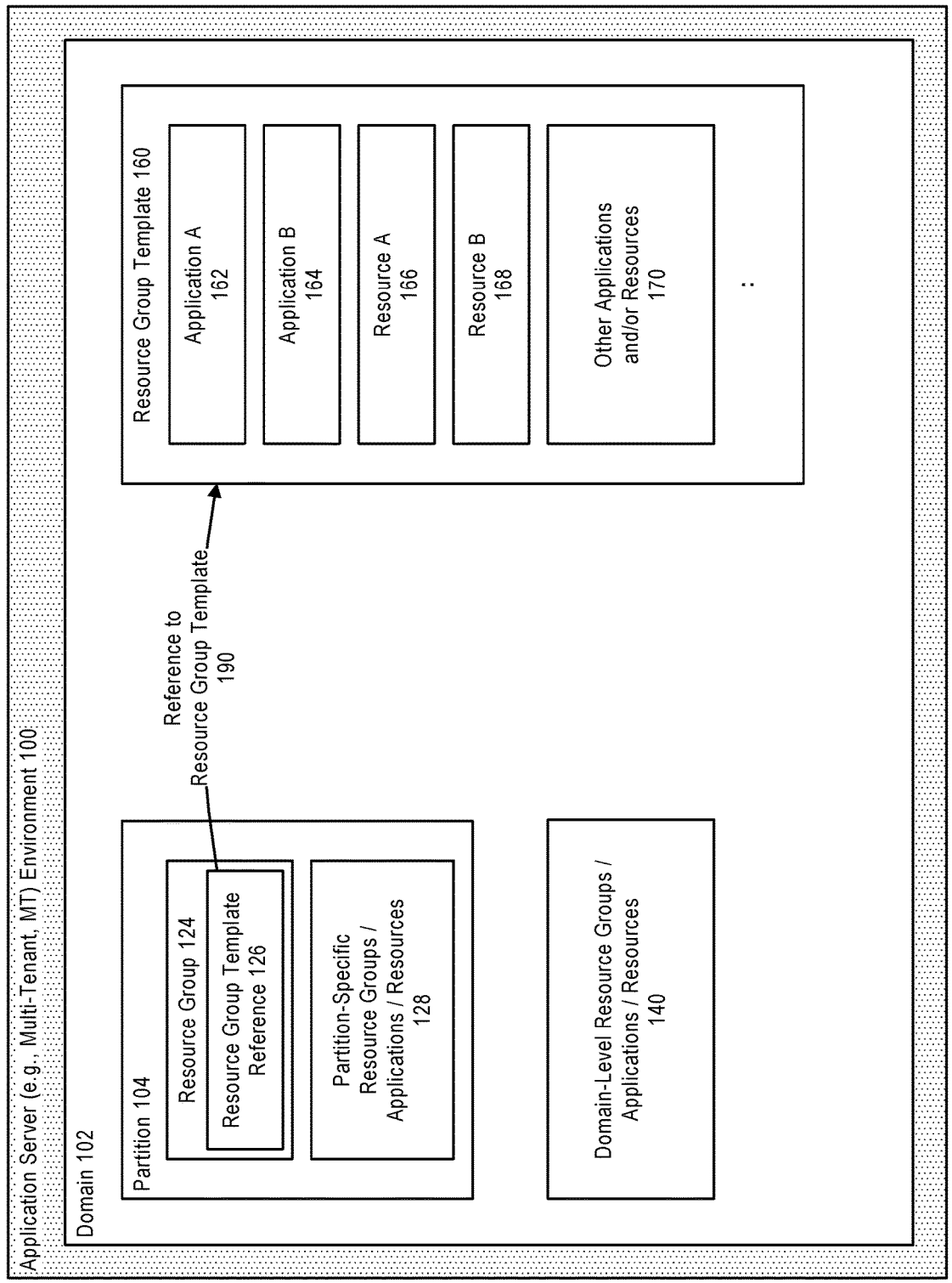
FIG. 1 illustrates a system for supporting multi-tenancy in an application server, cloud, or other computing environment, in accordance with an embodiment.

FIG. 1 illustrates a system for supporting multi-tenancy in an application server, cloud, or other computing environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
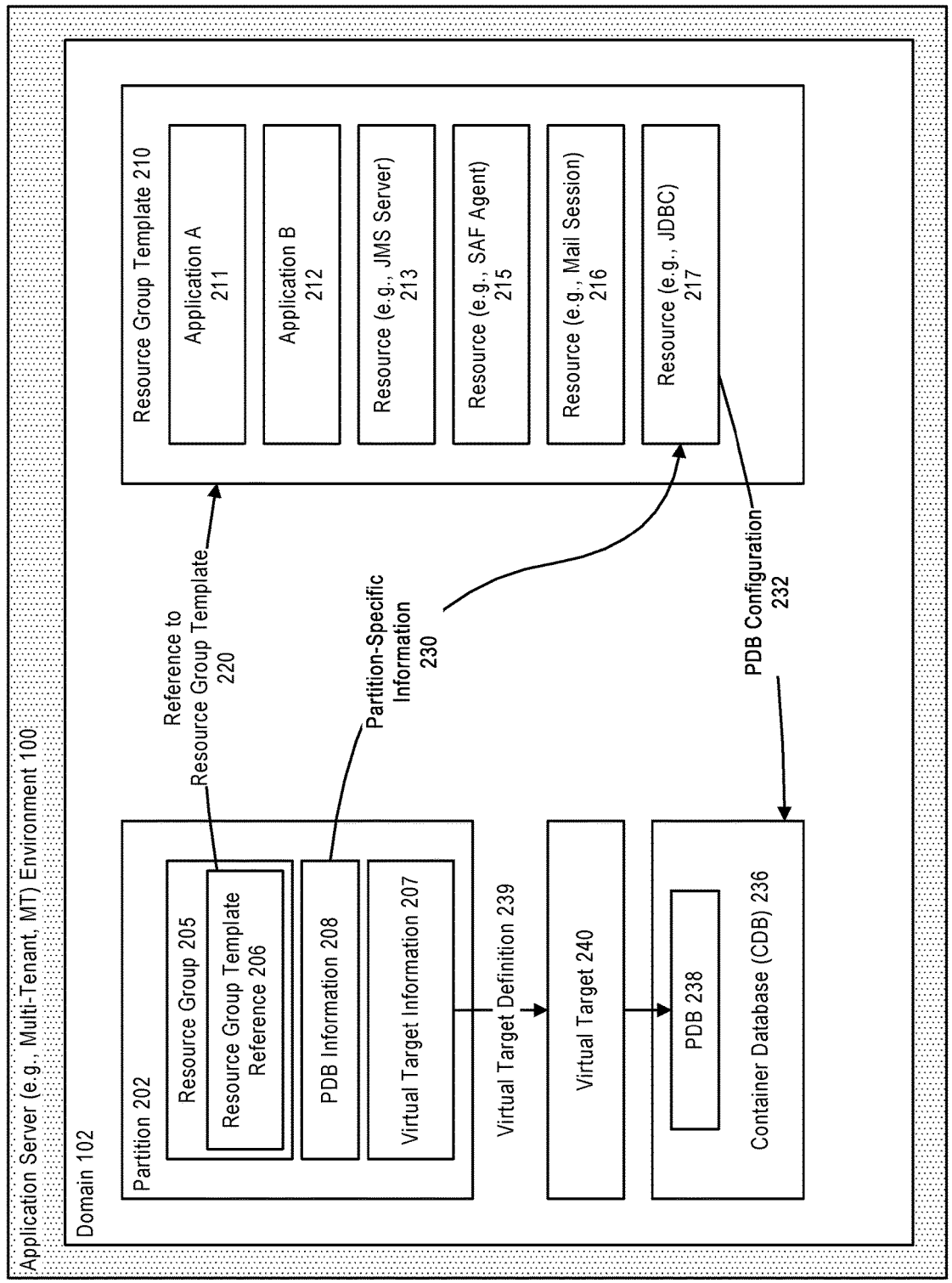
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
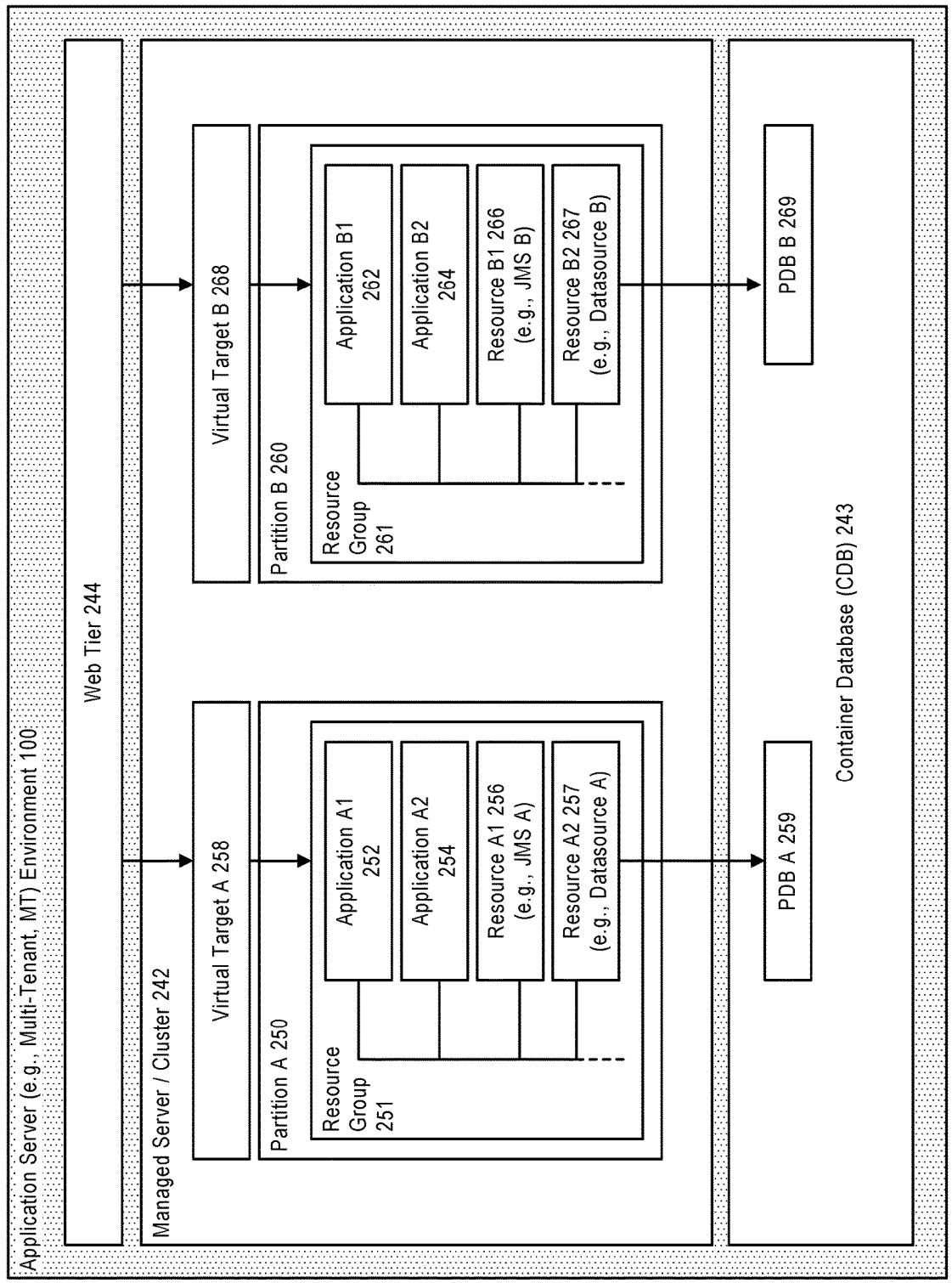
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRM DataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Example Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
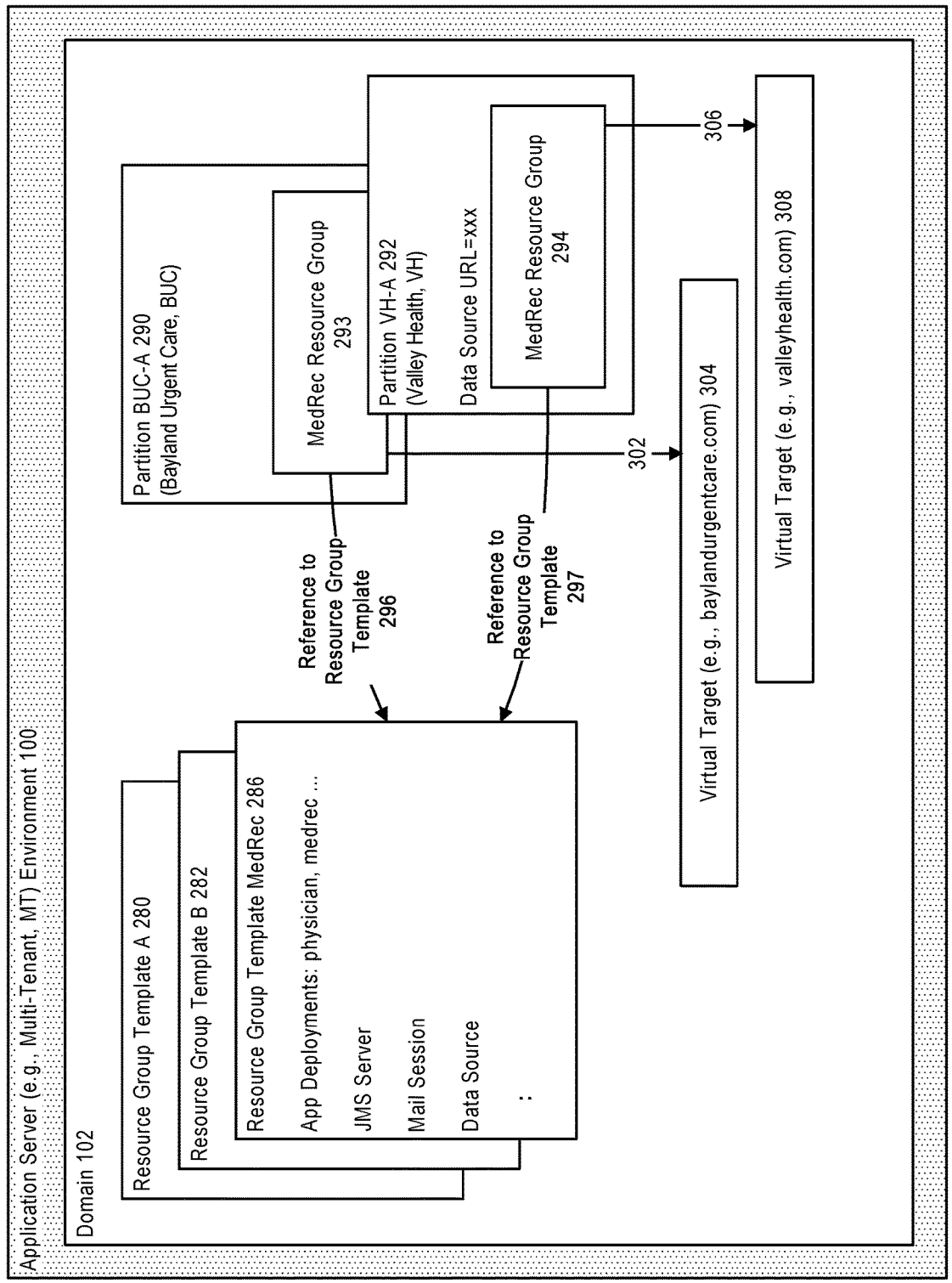
FIG. 4 illustrates a domain configuration for use with an example multi-tenant environment, in accordance with an embodiment.

FIG. 4 illustrates a domain configuration for use with an example multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
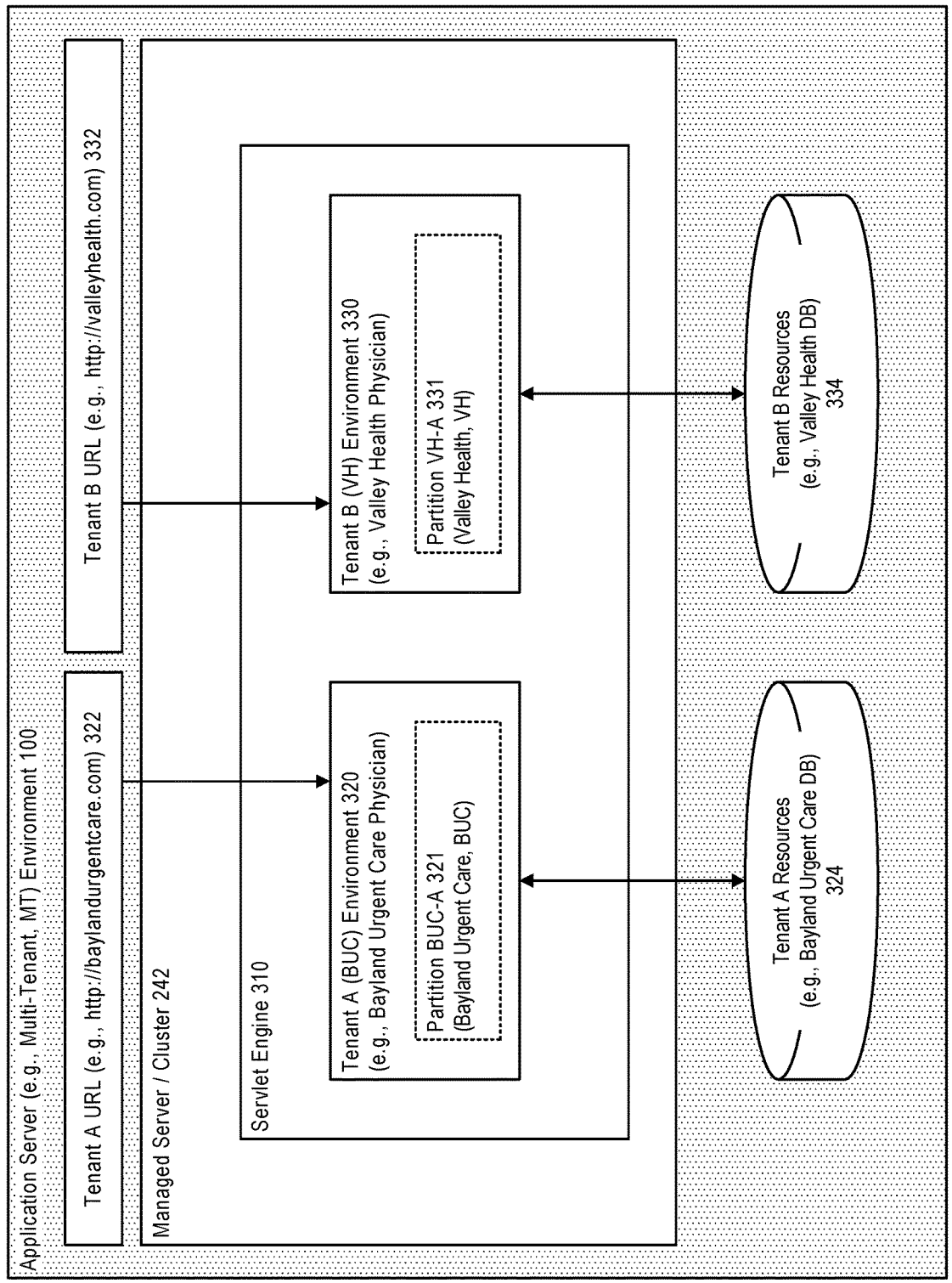
FIG. 5 further illustrates an example multi-tenant environment, in accordance with an embodiment.

FIG. 5 further illustrates an example multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland urgent care database, or a Valley Health database respectively. The database instances can use compatible schemas, since the same application code will execute against both databases. When the system starts the partitions, it can create the virtual targets and connection pools to the respective database instances.

Lifecycle Management

In accordance with an embodiment, the system can include a lifecycle manager (LCM) that enables configuration of partitions associated with components, for example application servers, traffic directors or load balancers, database, or other components, which may have their own partition-specific configurations.

Figure 6:
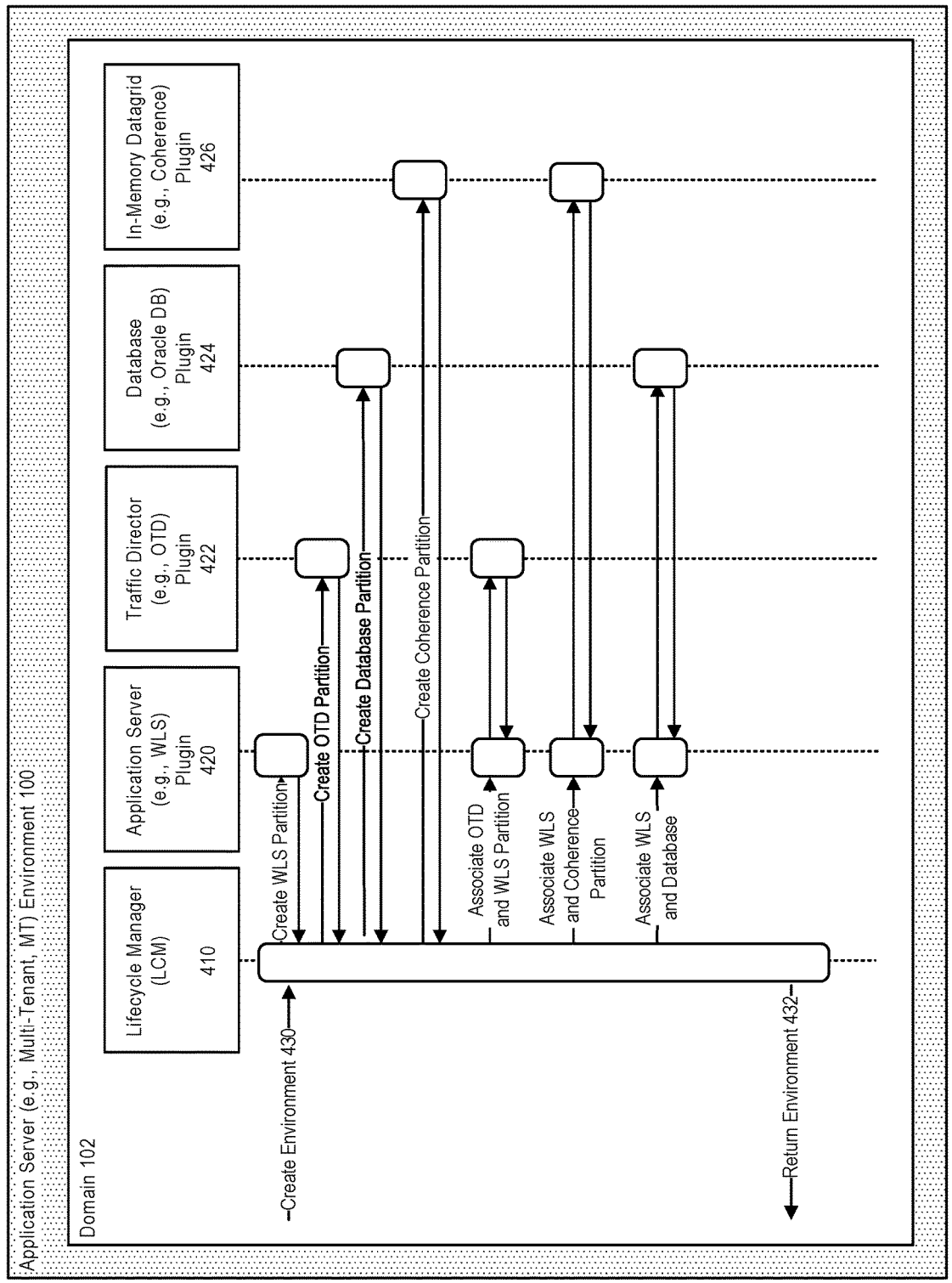
FIG. 6 illustrates the use of a lifecycle manager in a multi-tenant application server environment, in accordance with an embodiment.

FIG. 6 illustrates the use of a lifecycle manager in a multi-tenant application server environment, in accordance with an embodiment.

As illustrated in FIG. 6, in accordance with an embodiment, the lifecycle manager (LCM) 410 enables configuration via, in this example, an application server (e.g., WLS) lifecycle plugin 420, a traffic director (e.g., Oracle Traffic Director, OTD) lifecycle plugin 422, a database (e.g., Oracle Database) lifecycle plugin 424, and/or an in-memory data grid (e.g., Coherence) lifecycle plugin 426. In response to receiving a request to create an environment 430, the LCM orchestrates the creation and association of component partitions, and returns the environment 432, for use by a tenant.

For example, in accordance with an embodiment, as part of creating a partition for use with an application server, then, in addition to creating the application server partition, the system allows creation of a slice of runtime in other components that will be wired up with the application server partition. The result is a system in which an application can be run within its own environment from, e.g., a traffic director layer, down to a database layer.

In accordance with an embodiment, a plugin-based mechanism enables different components within a multi-tenant application server environment to provide their own component-specific lifecycle functionality. A component which will be made available to be wired up with a partition can provide its own plugin. Lifecycle operations can then call the plugin interface, which in turn performs the actual creation of the component, for example, the creation of a traffic director instance, or the creation of a database instance, as appropriate.

For example, in accordance with an embodiment, the LCM can be used to support the creation of components within the middleware or database stack, and to support the wiring of those components, such as wiring up an application server (e.g., WLS) partition to use a datasource. The collection of wired components can then be provided within a partition or tenant environment.

As another example, in accordance with an embodiment, the system can enable an application server partition to be associated with a database, and created during a lifecycle, which then creates a datasource in the application server partition and makes it usable within a partition or tenant environment.

Additional details regarding lifecycle management and an embodiment of the LCM are provided in U.S. Patent Application titled "SYSTEM AND METHOD FOR PROVIDING END TO END LIFECYCLE IN A MULTITENANT APPLICATION SERVER ENVIRONMENT", application Ser. No. 14/864,725, filed Sep. 24, 2015; and U.S. Patent Application titled "SYSTEM AND METHOD FOR DATABASE AND APPLICATION SERVER LIFECYCLE PLUGINS IN A MULTITENANT APPLICATION SERVER ENVIRONMENT", application Ser. No. 14/864,719, filed Sep. 24, 2015; each of which above applications are herein incorporated by reference.

Provisioning Framework

As described above, in an application server environment which supports the use of domains within which software applications are executed, the provisioning of such domains can be handled automatically by provisioning tools that enable the copying of resources, supply of credentials, running of custom code, or other provisioning activities. However, in a multi-tenant application server environment, in which a domain may be partitioned for use by multiple tenants, resources such as external systems or other components required for a particular partition must be provisioned properly in order to support that partition.

In an Oracle environment, examples of such components may include Java Required Files (JRF) components, which are generally not included in the application server (e.g., WebLogic Server) installation itself, but instead provide a common functionality for use by various enterprise applications, e.g., Oracle business applications, and application frameworks.

In accordance with an embodiment, a JRF component may include not just its core libraries, but also resources such as files, and connections to properly stocked external systems, such as database schemas, that must exist before the component can be used. Provisioning enables the setting up those resources and stocking those external systems so that they are ready for use.

Although in a traditional application server environment, domain creation and provisioning tools enable the copying of resources, supply of credentials, running of custom code, and other provisioning activities, such that when a domain is created, it has also been provisioned; in a multi-tenant environment that includes partitions, partition-oriented creation and provisioning tools must be able to set up resources directly (e.g., to copy files) and must also be able to run provisioning code (e.g., to insert rows into database tables), so that a given component that will form part of a domain partition can be set up for use in that partition.

In accordance with various embodiments, the system can include or utilize some or all of the following features:

Provisioning: The act of setting up a system or a part of a system for use. Provisioning happens after creation.

Domain Provisioning: The act of provisioning an application server domain, including in some instances the provisioning of areas of affiliated systems, such as database schemas.

Partition: An application server domain partition.

Partition Provisioning: The act of provisioning an area of an application server domain, including in some instances the provisioning of areas of affiliated systems, such as database schemas.

Partition Provisioning Metadata: XML resources that serve as logical partition provisioning instructions.

Partition Provisioning Component: A collection of partition provisioning metadata and related code that provisions a partition. A partition provisioning component may contain partition provisioning metadata, code or both; has a name that is unique with respect to all other partition provisioning components; and may logically depend on another partition provisioning component.

Handler Class: A class that belongs to a partition provisioning component that will process partition provisioning metadata supplied by that partition provisioning component and other partition provisioning components.

Handler Method: A method in a handler class that can process partition provisioning metadata. Handler classes may have zero or more handler methods.

Initialization Method: An optional method in a handler class that can initialize some of or all of the contents of a partition without requiring any partition provisioning metadata. Handler classes may have at most one initialization method.

Handler Method Registration: The expressing of interest by a handler method in particular kinds of partition provisioning metadata that it is capable of processing.

Metadata Event: A logical event that announces to a handler method that particular kinds of partition provisioning metadata are available for that handler method to process. Metadata events are delivered as a by-product of handler method registration.

User-Supplied Data: Data that will be supplied by a user at or near partition creation and provisioning time. User-supplied data can include such things as usernames and passwords and external system connection information.

System-Supplied Data: Variable data that some aspect of the system involved in the provisioning process can supply for use by partition provisioning components. Examples of system-supplied data include directory names, and partition names.

Configurable Attribute: A named and typed "slot" in a partition provisioning component, typically an appropriately annotated instance field, which will receive user-supplied or system-supplied data values.

Inflation: The process of transforming a partition provisioning metadata resource (e.g., an XML document) in memory, so that it can contain (perhaps sensitive) user-supplied data. For example, the resource can include values for configurable attributes that are relevant to provisioning the particular partition to be provisioned based on the user and system data.

Provisioning Operation

In accordance with an embodiment, a provisioning operation is executed by cooperating provisioning components on a set of existing systems designed to prepare those systems for subsequent use by other software components. Examples of provisioning operations include initial provisioning and deprovisioning. Executing a provisioning operation against a set of systems is (definitionally and necessarily) not the same as creating those systems.

Provisioning Component

In accordance with an embodiment, a provisioning component is a named, logical grouping of any number of the following artifacts, that supplies provisioning instruction documents, processes provisioning instruction documents or both: provisioning instruction documents (resulting from provisioning resources); configurable attribute factories handler classes; any other HK2 services (including Factory implementations).

In accordance with an embodiment, a provisioning component should meet the following requirements: It has a name. It may have a version. It is selectable or not selectable. A provisioning component is selectable if a user can choose it explicitly to take part in provisioning operations. If a provisioning component is not selectable, it may still take part in provisioning operations as a dependency or affiliate of another provisioning component. It may contain zero or more provisioning instruction documents. It may contain zero or more HK2 services that indicate they belong to it. It may declare zero or more affiliations with other provisioning components. It may have zero or more computed dependencies on other provisioning components.

Non-limiting examples of the ways a provisioning component could be provided include: As a directory in a filesystem; As an archive, such as a .zip file; As a directory entry in an archive, such as a .zip file; As a file or classpath.

Provisioning Component Membership

In accordance with an embodiment, artifacts may belong to a provisioning component. Any HK2 service (including but not limited to handler classes, configurable attribute factories and Factory implementations) should indicate its membership in a provisioning component by supplying HK2 metadata identifying it as belonging to that provisioning component (for example, by annotating it with the Component annotation, specifying the name of the provisioning component as the value of the Component annotation's value element).

Handler Class

In accordance with an embodiment, a handler class is an HK2 service, and therefore a Java class, that belongs to a provisioning component and contains handler methods that can execute provisioning instruction documents; and should meet the following requirements: It is public. It is not final. It has any valid Java class name. It belongs to any Java package. It has zero or one arbitrary superclass. Its inheritance hierarchy is of arbitrary depth. It implements zero or more arbitrary interfaces. It has a public constructor that takes no arguments. It has no final methods. It is associated with HK2 metadata identifying it as an HK2 service and is present in the ServiceLocator used by the system implementing this specification (for example, by annotating it with the Service annotation, which is processed by the HK2 inhabitant generator, and placing it on the classpath). It is associated with HK2 metadata identifying it as belonging to a provisioning component (for example, by annotating it with the Component annotation). It is associated with HK2 metadata identifying it as a handler class (for example, by annotating it with the Handler annotation). It is associated with HK2 metadata identifying it as a message receiver (for example, by annotating it with the MessageReceiver annotation). It is associated with HK2 metadata identifying it as belonging to the provisioning operation scope (for example, by annotating it with the ProvisioningOperationScoped annotation). It and any of its superclasses each contain zero or one initialization method. It and any of its superclasses each contain zero or one cleanup method. It contains zero or more handler methods. It may define zero or more configurable attributes.

Handler Method

In accordance with an embodiment, a handler method is a method declared or inherited by a handler class that can execute provisioning instruction documents in the context of a provisioning operation; and should meet the following requirements: It must be declared in or inherited by a handler class. It is public. It is not static. It is not final. It has any valid Java method name. It has exactly one method parameter of type ProvisioningEvent. Its single method parameter of type ProvisioningEvent is annotated with at least the following: the HK2—defined SubscribeTo annotation; at least one provisioning event qualifier annotation; zero or one provisioning operation qualifier annotation. If a provisioning operation qualifier annotation is not specified, the handler method will behave as though there were an InitialProvisioningOperation provisioning operation qualifier annotation present. It has zero or more additional method parameters, each of which will be treated as an HK2 injection point and therefore supplied with an appropriate HK2 service instance at runtime. It may throw any checked or unchecked Exception.

EXAMPLES

In accordance with an embodiment, the following handler method is valid for handling resources during initial provisioning:

```
// Fully specified initial provisioning handler method example
public void validHandlerMethodForInitialProvisioning1(
    @SubscribeTo
    @InitialProvisioningOperation
    @ProvisioningEventQualifierAnnotationAnnotatedWithHandlesResources
    final ProvisioningEvent event)
    throws MyException { }
```

In accordance with an embodiment, the following handler method is also valid for handling resources during initial provisioning, and will behave identically to the prior example (note the lack of the InitialProvisioningOperation annotation):

```
// Implicit initial provisioning handler method example
public void validHandlerMethodForInitialProvisioning2(
    @SubscribeTo
    @ProvisioningEventQualifierAnnotationAnnotatedWithHandlesResources
    final ProvisioningEvent event)
    throws MyException { }
```

Handler

In accordance with an embodiment, a handler is an instance of a handler class.

Initialization Method

In accordance with an embodiment, an initialization method is an optional method declared in a Java class representing an HK2 service or any of its superclasses that is annotated with PostConstruct and which adheres to the requirements defined by the PostConstruct annotation documentation.

Cleanup Method

In accordance with an embodiment, a cleanup method is an optional method declared in a Java class representing an HK2 service or any of its superclasses that is annotated with PreDestroy and which adheres to the requirements defined by the PreDestroy annotation documentation.

Provisioning Event Qualifier Annotation

In accordance with an embodiment, a provisioning event qualifier annotation is a Java annotation that annotates the required, single method parameter of type ProvisioningEvent of either a handler method or a configurable attribute factory implementation's getConfigurableAttributes(ProvisioningEvent) method. It indicates that the method should be invoked when a particular provisioning instruction document is available for processing at a relevant time as described by the annotated ProvisioningEvent.

In accordance with an embodiment, a provisioning event qualifier annotation should meet the following requirements: It has any valid annotation name. It is annotated with the following annotations: Documented; Qualifier; Retention (RetentionPolicy.RUNTIME). It is annotated with the HandlesResources meta-annotation, whose elements may be set to any permitted values. It is annotated with the Target annotation, whose value element's return value must include the following objects: ElementType.FIELD and ElementType.PARAMETER. (By definition, all annotations annotated with Qualifier must be applicable to fields and parameters, even though this particular qualifier annotation will rarely, if ever, be used to annotate a field).

Provisioning Operation Meta-annotation

In accordance with an embodiment, there is exactly one designate particular provisioning operations meta-annotation in the provisioning framework, which should meet the following requirements: It has the fully-qualified name com.oracle.weblogic.lifecycle.provisioning.api.annotations.ProvisioningOperation. It is annotated with the following annotations: Documented; Retention(RetentionPolicy.RUNTIME); Target(ElementType.ANNOTATION_TYPE).

Provisioning Operation Qualifier Annotation

In accordance with an embodiment, a provisioning operation qualifier annotation is a Java annotation that may qualify Java elements, such as types, fields, methods, parameters, and other annotations that are related to a provisioning operation.

In accordance with an embodiment, a provisioning operation qualifier annotation should meet the following requirements: It has any valid annotation name. It is annotated with the following annotations: Documented; Qualifier; ProvisioningOperation; Retention(RetentionPolicy.RUNTIME). It is annotated with the Target annotation, whose value element's return value must include ElementType.FIELD, ElementType.METHOD, ElementType.PARAMETER and ElementType.TYPE. (By definition, all annotations annotated with Qualifier must be applicable to fields and types).

Provisioning Resource

In accordance with an embodiment, a provisioning resource is a pairing of an absolute URI representing a provisioning instruction document with a set of arbitrary textual properties that further describe its attributes.

Provisioning Instruction Document

In accordance with an embodiment, a provisioning instruction document is a collection of instructions for which there exists one handler method capable of executing it to perform a provisioning operation. Provisioning instruction documents are the primary way that a provisioning component describes a provisioning operation.

In accordance with an embodiment, a provisioning instruction document should meet the following requirements: It is a well-formed XML document. It has a name. (The name of a provisioning instruction document appearing in a filesystem is the name of the file that contains it. The name of a provisioning instruction document appearing in an archive such as a .zip file is the name of the entry within the archive that contains it). It can be parsed and represented as a Document. The Document that results must have a non-null documentURI property whose value is a URI identifying the provisioning instruction document and terminating in its name. It belongs to a provisioning component. It is executable by at least one of a handler's handler methods that has indicated this by annotating its required sole ProvisioningEvent parameter with, among possibly other annotations, a required provisioning event qualifier annotation that must itself be annotated with a HandlesResources meta-annotation whose value element is non-null and contains at least one String with which the name of the XML document represented by the Document representing the provisioning instruction document ends.

Provisioning Component Dependency

In accordance with an embodiment, a provisioning component dependency is a computed dependency that exists between two provisioning components, C and H, when C supplies one or more provisioning instruction documents that are executable by one or more of H's handler methods. C is said in this case to depend on H. All provisioning component dependencies are computed. When a provisioning component dependency exists between two provisioning components, C and H, such that C depends on H, the following sequence of events will occur:

H's handlers will be instantiated.

If an error occurs, processing stops.

All of H's handlers' initialization methods, if any, will be invoked.

If an error occurs, all of H's handlers' cleanup methods, if any, are invoked in an unspecified order and processing stops.

C's provisioning instruction documents that H's handler methods have registered for will be delivered inside ProvisioningEvents as Documents to those handler methods.

If an error occurs, and H is an instance of TransactionalHandler, its rollback( ) method will be called.

If no error occurs, and H is an instance of TransactionalHandler, its commit( ) method will be called.

If an error occurs, and H is an instance of TransactionalHandler, its rollback( ) method will be called.

All of H's handlers' cleanup methods, if any, are invoked. Processing stops.

Note that C and H may designate the same provisioning component.

A provisioning component dependency is established between two provisioning components, C and H, when and only when the following requirements are satisfied:

C contains a provisioning instruction document, D.

H contains at least one handler class, HC, with at least one handler method, HM.

HM's (sole, required) ProvisioningEvent parameter is annotated with (and therefore qualified by) at least one provisioning event qualifier annotation, PEQA.

PEQA's (required) HandlesResources annotation's value element contains a String with which the name of D ends.

Provisioning Component Affiliation

In accordance with an embodiment, a provisioning component affiliation is a declared association between one principal provisioning component and a set of its affiliated provisioning components that can be used for any purpose. The affiliated provisioning components in a provisioning component affiliation need not be available when a provisioning operation is run for that operation to complete successfully. A provisioning component affiliation allows an end user to specify that one provisioning component should take part in a provisioning operation, while allowing the system to behave as though the user had specified that several provisioning components should take part in that provisioning operation. Affiliating two provisioning components by means of a provisioning component affiliation does not establish any provisioning component dependencies between them.

In accordance with an embodiment, a provisioning component affiliation differs from a provisioning component dependency in the following ways: A provisioning component affiliation is declared. A provisioning component dependency is computed. A provisioning component affiliation need not designate available provisioning components. By definition, a provisioning component dependency is between two available provisioning components.

Transformation

In accordance with an embodiment, transformation is the process of transforming a provisioning component's provisioning instruction document from its XML representation into its Document representation when it is delivered to a handler method during a provisioning operation. When a conformant implementation of the provisioning framework has computed a provisioning component dependency and therefore is preparing to deliver a provisioning instruction document to a handler method, it should:

Parse the provisioning instruction document's XML representation into a Document. If parsing fails, an error must be thrown and processing stops.

Locate a Transformer<Document, Document> appropriate for the provisioning instruction document's XML representation.

A conformant implementation of the provisioning framework may use any mechanism it wishes to locate a Transformer<Document, Document>.

If the implementation's mechanism of locating a Transformer<Document, Document> does not yield a Transformer<Document, Document>, then a Transformer<Document, Document> that implements the following default algorithm in its transform(Document) method must be used instead:

Let D be the final component of the URI of the provisioning instruction document's XML representation.

Let S be the suffix of D, defined as the substring starting with the last period found in D and including the rest of the string.

Modify D by replacing S with ".xslt".

Attempt to load and parse the classpath resource named D as an XSLT stylesheet.

If an XSLT stylesheet is loaded and successfully parsed, apply it to the supplied Document and return the result. If an error occurs, processing stops.

If an XSLT stylesheet is not found, return the supplied Document.

If a Transformer is found, invoke the Transformer's transform(Document) method, passing it the parsed Document.

If for any reason no Transformer could be located, no transformation will occur.

If transformation did not occur, supply the original parsed Document to the handler method.

If transformation did occur, supply the return value of the transform(Document) method to the handler method.

Configurable Attribute

In accordance with an embodiment, a configurable attribute is a named variable in an HK2 service belonging to a provisioning component intended to hold a value supplied by the user. Configurable attributes are annotated with the ConfigurableAttribute annotation within the provisioning framework.

In accordance with an embodiment, a configurable attribute should meet the following requirements: It is represented by a ConfigurableAttribute annotation applied to an instance field, instance method parameter or constructor parameter in a class belonging to a provisioning component, or by a ConfigurableAttribute annotation instance produced by a ConfigurableAttributeFactory instance's getConfigurableAttributes(ProvisioningEvent) method. It has a name, represented by the name element of the ConfigurableAttribute annotation. It has a default value, represented by the defaultValue element of the ConfigurableAttribute annotation. A configurable attribute's default value is a String. A configurable attribute's default value must not be null. It implicitly belongs to a provisioning component. If it is represented by a ConfigurableAttribute annotation applied to an instance field, method or constructor parameter in a class belonging to a provisioning component, then it belongs to the provisioning component that the class containing the annotated element belongs to. If it is represented by a ConfigurableAttribute annotation instance produced by a ConfigurableAttributeFactory instance's getConfigurableAttributes(ProvisioningEvent) method, then it belongs to the provisioning component that contains the provisioning instruction document represented by the return value of that method's ProvisioningEvent parameter's getDocument( )method.

Configurable Attribute Factory

In accordance with an embodiment, a configurable attribute factory is a Java class that implements the ConfigurableAttributeFactory interface and an HK2 service that belongs to a provisioning component. It can produce ConfigurableAttribute instances on behalf of a provisioning component. Provisioning components do not have to contain any configurable attribute factories.

In accordance with an embodiment, a configurable attribute factory should meet the following requirements: It is public. It is not final. It has any valid Java class name. It implements the ConfigurableAttributeFactory interface. It belongs to any Java package. It has zero or one arbitrary superclass. Its inheritance hierarchy is of arbitrary depth. It is associated with HK2 metadata identifying it as an HK2 service and is registered in the WebLogic Server GlobalServiceLocator (for example, by annotating it with the Service annotation, which is processed by the HK2 inhabitant generator, and placing it on the classpath). It is associated with HK2 metadata identifying it as belonging to a provisioning component (for example, by annotating it with the Component annotation). It has a public constructor that takes no arguments. It has no final methods. Its getConfigurableAttributes(ProvisioningEvent) method's sole parameter of type ProvisioningEvent is annotated with a provisioning event qualifier annotation.

Configurable Attribute Value

In accordance with an embodiment, a configurable attribute value is a value that is associated with a configurable attribute; and should meet the following requirements: It is associated or otherwise stored with the configurable attribute which logically names it for the lifetime of a provisioning operation. It is determined at the beginning of a provisioning operation and does not change over the lifetime of a provisioning operation. It may be user-supplied, when it results from a user explicitly entering it, or default, when it is the default value for its configurable attribute. If it is the default value for its configurable attribute, it must not be null; otherwise, it may be null. It has a source data type, which must be String. It may have a target data type, which is defined as the data type of the Java variable that will receive it. A configurable attribute value's target data type must be one of the following: Object; CharSequence; String; StringBuilder; StringBuffer; byte; char; Character; int; Integer; short; Short; long; Long; double; Double; float; Float; Boolean; Boolean; char[ ]; Character[ ]

Data Type Conversion

In accordance with an embodiment, a configurable attribute value a configurable attribute value may be converted from its source data type, String, to its target data type (the data type of the Java variable that will receive it). If data conversion fails, then any provisioning operation underway will abort with an error.

Provisioning of Partitions including JRF Components

In accordance with an embodiments, the lifecycle management and provisioning functionality described above can be applied to multi-tenant application server environments which include a domain that may be partitioned for use by multiple tenants, and wherein the components required to be provisioned for a particular partition include JRF components.

In accordance with an embodiment, JRF components can be associated with resource group templates packaged as domain extension templates, which can be used when creating a partition and supporting resource groups. For example, a JRF component can be provided with a classic domain extension template, which describes the way in which the component is deployed within a traditional (non-multi-tenant application server domain), and an MT domain extension template, which describes the way in which the component is provisioned within a partition in a multi-tenant application server domain. A user can select desired component types from available component types. Dependent component types are selected automatically by the partition provisioning framework, using a dependency discovery mechanism.

Figure 7:
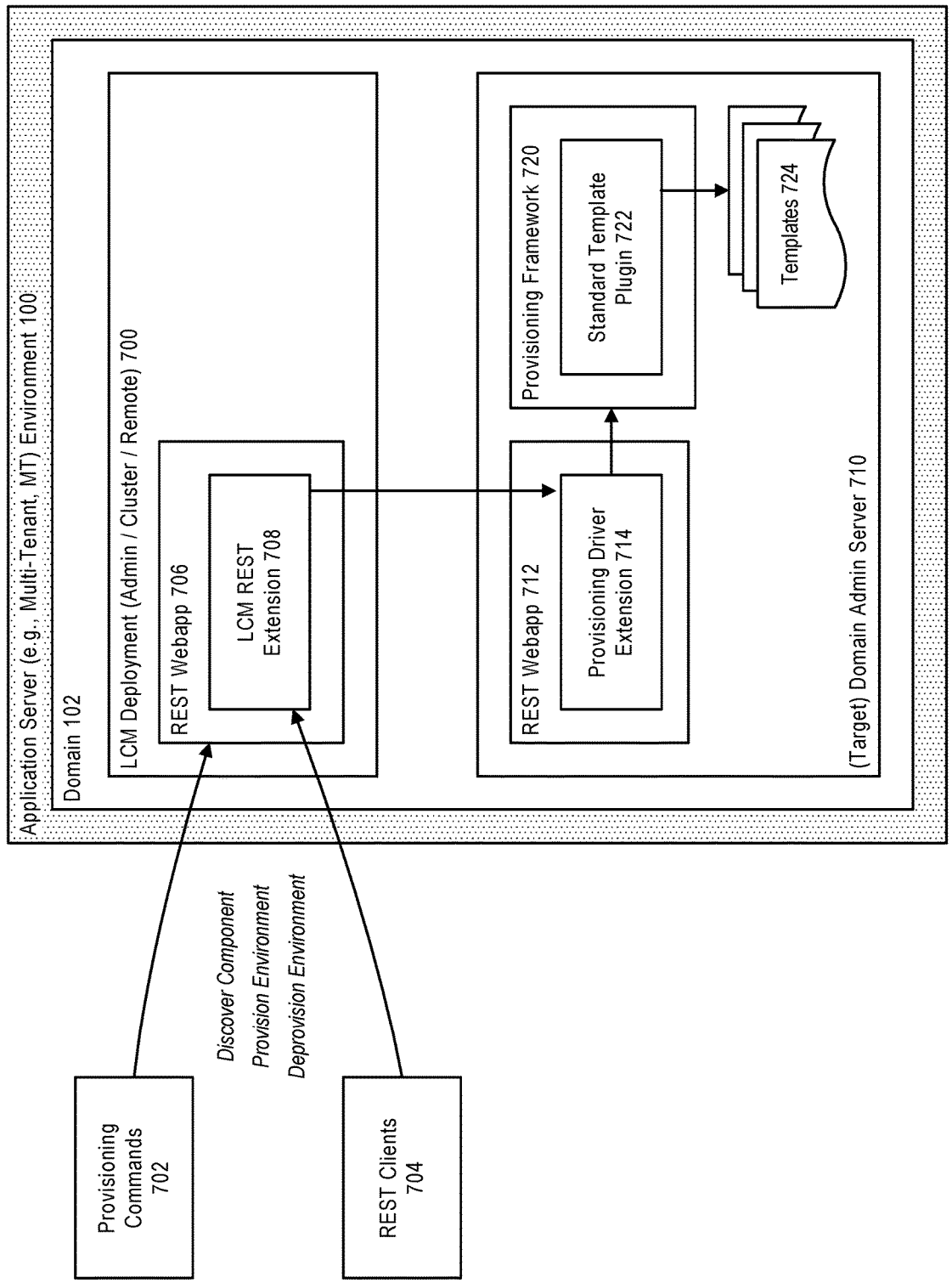
FIG. 7 illustrates a system for provisioning software applications for use in a multi-tenant application server environment, in accordance with an embodiment.

FIG. 7 illustrates a system for provisioning software applications for use in a multi-tenant application server environment, in accordance with an embodiment.

As illustrated in FIG. 7, in accordance with an embodiment, provisioning commands (for example, "discover components", "provision environment", or "de-provision environment") can be received from a variety of sources 702, 704, at a Lifecycle Manager (LCM) deployment 700, as described above.

In accordance with an embodiment, the LCM can provide, for example, a REST Webapp 706 for receiving the provisioning commands. The REST Webapp 706 can includes a LCM REST extension 708, which communicate with a provisioning driver extension 714 at a REST Webapp 712 in a target domain administration server 710. The REST Webapp at the target domain administration server can in turn communicate with a provisioning framework 720 that implements the provisioning functionality described above, using a standard template plugin 722, and/or one or more other templates 724.

In accordance with an embodiment, when the administrator deletes an environment, the provisioning framework identifies the partitions in the environment, and each of its components' handler methods with the signature public void <some-method-name> (@SubscribeTo @DeleteEnvironment Environment env) will be called. A new instance of a handler is instantiated at the beginning of the delete environment phase. The PostConstruct method will be called after injecting any ConfigurableAttributes. The values in these ConfigurableAttributes will be the same as they were during the provisioning phase. The handler instances are discarded after the environment is deleted.

In accordance with an embodiment, command line support for provisioning of partitions can also be provided, for example through the use of custom WLST commands.

In accordance with an embodiment, when the domain partition provisioning uses the functionality provided by the LCM described above, an application server domain partition is created and provisioned as part of a much larger request for the LCM to create a particular kind of Lifecycle Environment, namely one that supports pan e.g., WebLogic domain partition of a particular type that requires subsequent provisioning.

In accordance with an embodiment, creation of the (initially unprovisioned) partition, which is distinguished from its subsequent provisioning, is handled by the LCM as part of the environment's creation, using existing constructs (for example, a WLSPartitionPlugin).

In accordance with an embodiment, provisioning of that new partition, if it is supposed to support software requiring that it be provisioned, is handled by the partition provisioning framework, running locally on the administration server of the domain where the new, unprovisioned partition has just been created.

In accordance with an embodiment, the LCM communicates a provisioning request, if appropriate, from its location to the partition provisioning framework. The partition provisioning framework then arranges for the proper partition provisioning components collocated with it to provision the partition.

In accordance with an embodiment, the provisioning framework supports component-specific handlers for partition provisioning events. After a new partition has been created, but before it has been properly provisioned, a number of actions may be required to set it up for use, such as copying files, executing scripts, updating configurations, and so forth. While some of these actions are straightforward (for example, creating directories and copying specified files into those directories), other actions may be more complicated, subsystem-specific and may evolve from release to release.

Figure 8:
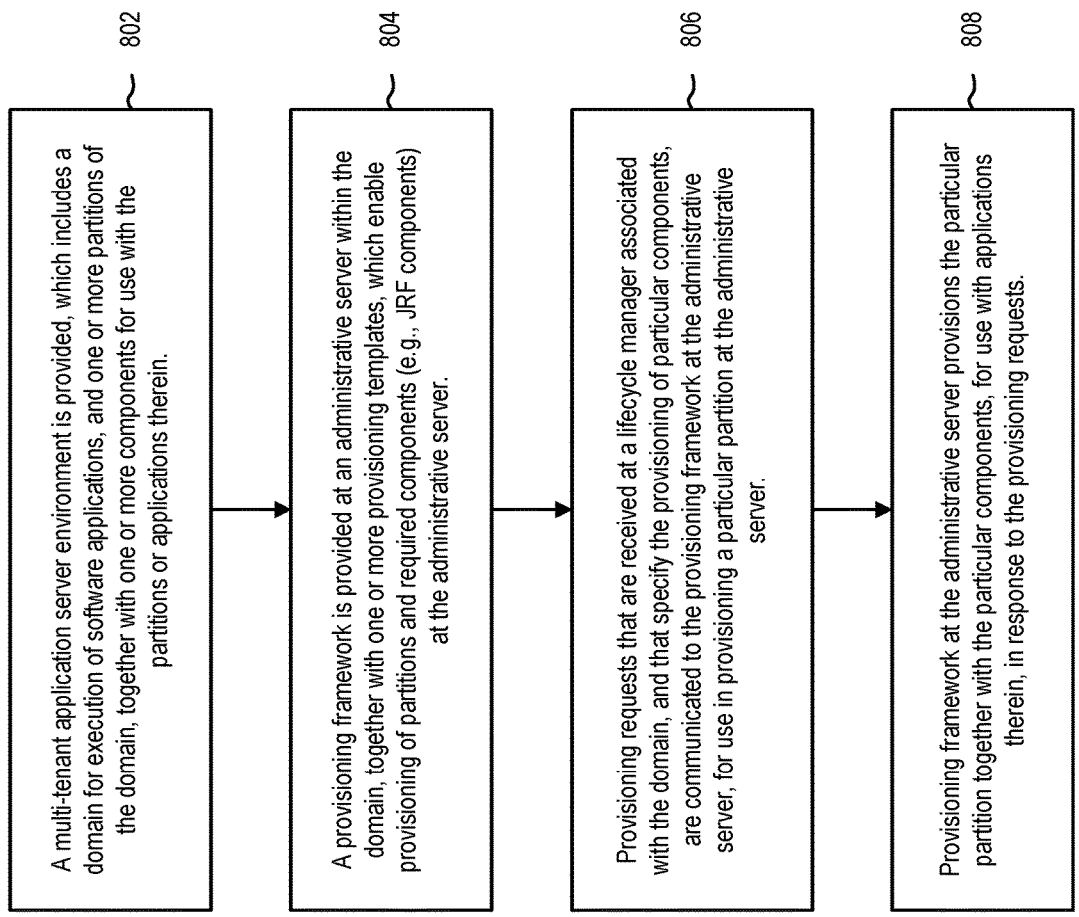
FIG. 8 illustrates a flowchart of a process for provisioning software applications for use in a multi-tenant application server environment, in accordance with an embodiment.

FIG. 8 illustrates a flowchart of a process for provisioning software applications for use in a multi-tenant application server environment, in accordance with an embodiment.

As illustrated in FIG. 8, in accordance with an embodiment, at step 802, a multi-tenant application server environment is provided, which includes a domain for execution of software applications, and one or more partitions of the domain, together with one or more components for use with the partitions or applications therein.

At step 804, a provisioning framework is provided at an administrative server within the domain, together with one or more provisioning templates, which enable provisioning of partitions and required components (e.g., JRF components) at the administrative server.

At step 806, provisioning requests that are received at a lifecycle manager associated with the domain, and that specify the provisioning of particular components, can be communicated to the provisioning framework at the administrative server, for use in provisioning a particular partition at the administrative server.

At step 808, the provisioning framework at the administrative server provisions the particular partition together with the particular components, for use with applications therein, in response to the provisioning requests.

Environment Creation Initiation

In accordance with an embodiment, a user creates a Lifecycle Environment by performing the following steps. Upon submission of the following user-supplied data the Lifecycle Orchestration environments' REST API is invoked to initiate the creation of the Lifecycle Environment, including partition creation and association. After association, the partition provisioning is then initiated:

The user selects the desired component types from the available component types. Dependent component types are selected automatically by the partition provisioning framework, using the dependency discovery mechanism specified below.

The partition provisioning framework presents the user with all transitively discovered ConfigurableAttributes that require user-supplied data.

The user supplies data for each ConfigurableAttribute so presented.

The LCM arranges for the environment to be created, including partition creation and association in the environment, using its normal constructs, such as PartitionPlugin implementations.

If a component has been included that supports provisioning, then the TemplateBasedPlugin will be the last plugin invoked in the overall orchestration.

The TemplateBasedPlugin communicates with the partition provisioning framework running on the administration server of the domain where the (as-yet-unprovisioned) partition has been created. It communicates the name of the component that needs to be supported on that partition. That component or its dependents will likely require provisioning.

The partition provisioning framework running on the domain administration server provisions the new partition for each selected component type as follows:

From the dependency list obtained above, the framework performs a topological sort and identifies the proper provisioning order. For example, if component type A depends on component type B (A→B) and B→C and C→D and C→E, then the dependency list is D, E, C, B, A (D and E don't depend on any other component and can be provisioned in either order).

For each component type identified in the above dependency list, provision the partition as described below.

Partition Provisioning Initiation

In accordance with an embodiment, partition provisioning begins when the LCM-supplied TemplateBasedPlugin #create method is called as part of an overall environment creation as described in above. The TemplateBasedPlugin's create( )method issues a REST request to the partition provisioning framework, running in the global runtime of the administration server of the domain on which the as-yet-unprovisioned partition has just been created. The partition provisioning framework responds to the REST request by performing the following steps:

Begin a provisioning operation. This begins an appropriate HK2 scope and supports partition provisioning componentry that has been annotated with the ProvisioningOperationScoped annotation.

Identifies the resources in the template jar that can be handled by a handler class in this component itself or by a handler class in another component.

If the handler class is defined in a different component and if the other component's partition hasn't been provisioned yet, then it is an error.

If resources have been found that a given handler class can process, instantiate the handler class, once, in the ProvisioningOperation scope.

Instantiation is performed by HK2, and includes dependency injection, including invocation of any PostConstruct-annotated method, following the contract of the PostConstruct annotation. Most notably, only one such method per class may exist.

For each resource discovered above, locate an appropriate document transformer for the handler method that will process that resource, instantiate it, and supply its transform( )method a Document representing the partition provisioning metadata resource. Collect the transformed Document that results.

Using the handler instance instantiated above, perform dependency injection on it, and call its appropriate handler method, supplying it with a ProvisioningEvent event that encapsulates the Document to be processed.

If the handler implements the optional TransactionalHandler interface, then its commit( )method will be invoked.

After the above steps are complete, partition provisioning (for this component type) is complete.

If any Exception is caught in the above steps by the partition provisioning framework, then every instantiated handler that implements the optional TransactionalHandler interface will have its rollback( )method called exactly once. These rollback( )methods will be called in reverse order. For example, if six TransactionalHandler instances' handler methods succeed, and the seventh throws an Exception, then the seventh handler instance's rollback( ) method will be called, followed by the sixth handler's rollback( )method, followed by the fifth handler's rollback( )method, and so on.

Terminate the provisioning operation. This ends the appropriate HK2 scope and discards any instances of any HK2 services (such as handler classes) that belong to the ProvisioningOperation scope.

The set of ConfigurableAttributes that were collected during provisioning phase will be persisted in the (LCM) configuration. These ConfigurableAttributes will be used during the deleteEnvironment( ) call. In addition to the ConfigurableAttributes, the environment name, the list of components names, the partition names that make up the environment will also be persisted.

Dependency Discovery Mechanism

In accordance with an embodiment, the provisioning framework finds all handler classes. A handler class is an HK2 Service annotated with @Component, @ProvisioningOperationScoped, @Handler, @MessageReceiver and @Service that is written by a partition provisioning component author that can process some type of provisioning instruction documents (represented as XML classpath resources). These provisioning instruction documents can be supplied by the same or other partition provisioning components. The framework then examines each of the handler's methods that have the following signature:

```
public void methodName(@ProvisioningEventQualifierAnnotation
    @SubscribeTo
    @QualifierAnnotation
    ProvisioningEvent provisioningEvent);
``` where @QualifierAnnotation is some qualifier annotation that is in turn itself annotated with Qualifier and HandlesResources annotations, and @ProvisioningEventQualifierAnnotation is some qualifier annotation that is in turn itself annotated with Qualifier and ProvisioningOperation.

In accordance with an embodiment, if such a method is found, then the HK2 Service is identified as a Handler from the Component whose component name is the value specified in the Component annotation. The value(s) specified in the HandlesResources indicates the resource name patterns that this handler can handle.

In accordance with an embodiment, once the set of all handlers (and their component types) have been identified, the framework builds the dependency graph as follows:

For each component name, the framework scans the content of its corresponding domain template archive.

For each appropriate provisioning instruction document found in that domain template archive, the framework discovers the handler class that can handle this resource.

If the handler class in the above step is supplied by a different component type, then there is a dependency between the current component type (whose domain template archive is being scanned) and the handler class' component. For example, if the domain template archive's component is A and the handler class' component is B, then A depends on B (denoted by A→B). For example, if the domain template archive for component A contains "_partition/security/component-security-info.xml" and component B provides the handler class that indicates that it can handle resources of the form "_partition/.*security-info.xml", then A→B.

The process is repeated for each provisioning component. At this point, the framework has identified the dependencies of each provisioning component. Example, A→(B, C, D) and B→(C, D) and C→D etc. The framework can then produce the dependency chain (based on a topological sort) for a given component type. In the example given above, the dependency chain for A is D, C, B, A. This means that to provision A, provisioning components of type D, C and B must be provisioned first (in that order).

Determining the set of ConfigurableAttributes for a Component Type

In accordance with an embodiment, the set of ConfigurableAttributes defined by a Component type is determined as follows:

For each Handler in a component, the framework detects the (Field) injected ConfigurableAttributes. These are the set of ConfigurableAttributes that are statically defined by this component.

Sometimes, some ConfigurableAttributes can only be dynamically generated based on possibly looking into some other metadata. In order to support this, the framework defines a HK2 Contract called ConfigurableAttributeFactory. A ConfigurableAttributeFactory will be defined by the component team and will be packaged along with the other classes.

Each ConfigurableAttributeFactory must be annotated with @Component. The value attribute of the Component annotation must specify the name of the owning component.

Each ConfigurableAttributeFactory may optionally be annotated with @HandlesResources to indicate the metadata that it needs to generate ConfigurableAttributes. (Question: What happens if this metadata is packaged in more than one template?)

To determine the set of all dynamically defined ConfigurableAttributes, the factory discovers all ConfigurableAttributeFactory classes for a particular component. It then calls the getConfigurableAttrbutes( )method by passing the requested metadata (if the class is annotated with @HandlesResources).

The union of ConfigurableAttributes defines the collection of ConfigurableAttributes for that component Now, given a component type, the framework can also determine the set of all ConfigurableAttributes required to properly provision it. For example, given A→(B, C, D), the set of ConfigurableAttributes to provision A is simply the closure of all ConfigurableAttributes in A, B, C and D.

Schema and Table Creation for Components

In accordance with an embodiment, in an Oracle environment. Oracle Fusion Middleware components often require the existence of schemas in a database prior to installation. These schemas are created and loaded in the database using a Repository Creation Utility (RCU). While provisioning JRF components, it may be necessary to first run RCU to create component specific schema and tables. In order to simplify this task, the framework will look for the existence of a file named "rcu.xml" under the domain template archive's _partition directory, an example of which is illustrated below. This xml is used for two purposes:

For obtaining ConfigurableAttributes: Any empty element will be assumed to be a ConfigurableAttribute. The framework will provide a ConfigurableAttributeFactory that will introspect this xml to provide the appropriate collection of ConfigurableAttributes.

To invoke RCU tools (using its command line interface, CLI). The values specified by the user as ConfigurableAttribute will be used to invoke RCU CLI. While invoking RCU, the database details (like PDB host, port, username, password) etc. will be provided by a framework provided "DBConfigurableAttributeFactory". This DBConfigurableAttributeFactory will provide the following item as a ConfigurableAttribute under the "db" namespace: dbType: This attribute indicates the type of DB like "Oracle", "Sybase" etc.; dbUser: The user name; dbPassword: db Password; dbUrl: the url that can be used to connect to. Thus any handler that wishes to obtain (for example the dbUser and dbUrl) can do the following:

```
                            rcu.xml
@ConfigurableAttributeReference(component="db", name="dbUser")
    private String dbUser;
@ConfigurableAttributeReference(component="db", name="dbUrl")
    private String dbUrl;
        <?xml version="1.0" encoding="UTF-8"?>
        <rcu>
            <db-role/>
            <run-rcu/>
            <schema-prefix/>
            <use-same-password-for-all-schemas/>
            <tablespace/>
            <temp-tablespace/>
            <variables>
                <variable name="passwordForOpss"
                    description="..." is-sensitive=true value=""/>
                <variable name="passwordForIAUViewer"
                    description="..." is-sensitive=true value=""/>
            </variables>
        </rcu>
```

In accordance with an embodiment, the framework will also provide a Transformer that will "inflate" (transform) the document by adding text nodes representing user-supplied values to the empty element nodes.

In accordance with an embodiment, the transformed document will then be given to a framework-provided handler class that will then invoke RCU to create the repository.

In accordance with an embodiment, if there are any exceptions during RCU's execution, then the handler class will throw a RuntimeException causing the provisioning to fail.

In accordance with an embodiment, if <run-rcu> is true, then only RCU tool is invoked to create tables and schemas (for the component that has packaged the rcu.xml). Example: if opss template packages rcu.xml (and if <run-rcu> is true, then RCU tool will be run with component-name=OPSS). If <run-rcu> is true, then during de-provisioning, the tables and schemas will be dropped. If <run-rcu> is false, then RCU will not be invoked at all. However, irrespective of whether <run-rcu> is true or false, the framework provided ConfigurableAttributeFactory will examine the packaged rcu.xml and present the user with the correct set of ConfigurableAttributes.

Finally, in accordance with an embodiment, the framework will allow the user supplied data to be injected into the handers. For example, if opss template has an rcu.xml, then a opss handler can inject the value specified for schemaprefix as follows:

```
@ConfigurableAttribute(name="schemaPrefix")
private String schemaPrefix;
```

Deployment Topology

In accordance with an embodiment, templates and provisioning code must execute in the target domain for a new domain partition and may update files, scripts, and configuration that is only available when running in that domain. To support this, Provisioning driver REST resources are provided on each administration server as a distributed API delegating to the local java provisioning APIs, enabling a remote client to initiate provisioning operations in a target domain.

In accordance with an embodiment, the scope of a new provisioned environment may extend far beyond a single domain partition, including database partitions, OTD configurations, and other supporting artifacts. To facilitate this broader scope, domain partition provisioning is supported within the broader orchestration framework of Lifecycle Manager. It is these orchestration REST calls that clients will use to initiate a partitioning request. Provisioning requests from any source, such as Enterprise Manager, a script, or an interactive user using WLST, are supported by the environment REST resources provided by Lifecycle Manager. The Lifecycle Manager uses information in the request to identify a target runtime and determine how to forward the request to the provisioning driver REST resources that are available on the administration server of the target domain. These Provisioning Driver REST resources parse the request body and make Provisioning API calls into the Provisioning framework classes to discover available components and metadata regarding their configuration, to provision new JRF component environments in the target domain, or to deprovision existing environments and clean up all supporting resources.

Environment Deletion Initiation

In accordance with an embodiment, when the administrator deletes the environment, the framework identifies the partitions in the environment (from the LCM configuration). Each of the components' handler methods with the signature public void <some-method-name>(@SubscribeTo @DeleteEnvironment Environment env) will be called. A new instance of a handler is instantiated at the beginning of the delete environment phase. The PostConstruct method will be called after injecting any ConfigurableAttributes. The values in these ConfigurableAttributes will be the same as they were during the provisioning phase.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory computer readable storage medium (media) having instructions stored thereon/in which can be used to program a computer to perform any of the processes of the present invention. Examples of such storage mediums can include, but are not limited to, hard disk drives, hard disks, hard drives, fixed disks, or other electromechanical data storage devices, floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, or other types of storage media or devices suitable for non-transitory storage of instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for provisioning in a multi-tenant application server environment, comprising:

a computer that includes one or more processors and an application server, cloud, or other environment executing thereon, and having a domain for execution of software applications, wherein the application server, cloud, or other environment includes a domain configuration that is used by the system at runtime to define the domain for execution of the software applications, a plurality of partitions of the domain, and one or more resource groups, wherein each partition, of the plurality of partitions, provides an administrative and runtime subdivision of the domain, and includes one or more partition-specific applications or resources;

a lifecycle manager that configures components of the application server, cloud, or other environment with partition-specific configurations, wherein each component is associated with a component-specific lifecycle, and wherein during configuration of a particular partition to include one or more components, the lifecycle manager performs lifecycle operations associated with configuration of the one or more components, to configure the one or more components for use with the particular partition; and a provisioning framework that enables provisioning of partitions, including that provisioning requests that are received at the lifecycle manager, and that specify the provisioning of the particular partition with particular components, are communicated to the provisioning framework, for use in provisioning the particular partition with the particular components, for use with applications deployed to the particular partition.

2. The system of claim 1, wherein the system is provided within a cloud environment.

3. The system of claim 1, wherein the system enables one or more partitions to be associated with a tenant, for use by the tenant.

4. The system of claim 1, wherein each of the components are associated with domain extension templates, which are used when creating a partition that includes that component.

5. The system of claim 1, wherein component types are selectable from available component types, and dependent component types are selected automatically by the provisioning framework, using a dependency discovery mechanism.

6. The system of claim 1, wherein the components required to be provisioned for a particular partition include Java Required Files (JRF) components.

7. A method of provisioning software applications for use in a multi-tenant application server environment, comprising:

providing, at one or more computers including a processor, an application server, cloud, or other environment executing thereon, and having a domain for execution of software applications, wherein the application server, cloud, or other environment includes a domain configuration that is used by the system at runtime to define the domain for execution of the software applications, a plurality of partitions of the domain, and one or more resource groups, wherein each partition, of the plurality of partitions, provides an administrative and runtime subdivision of the domain, and includes one or more partition-specific applications or resources;

providing a lifecycle manager that configures components of the application server, cloud, or other environment with partition-specific configurations, wherein each component is associated with a component-specific lifecycle, and wherein during configuration of a particular partition to include one or more components, the lifecycle manager performs lifecycle operations associated with configuration of the one or more components, to configure the one or more components for use with the particular partition; and receiving provisioning requests at the lifecycle manager, that specify the provisioning of a particular partition with particular components, and communicating the provisioning requests to a provisioning framework, for use in provisioning the particular partition with the particular components, for use with applications deployed to the particular partition.

8. The method of claim 7, wherein the method is provided within a cloud environment.

9. The method of claim 7, wherein the method enables one or more partitions to be associated with a tenant, for use by the tenant.

10. The method of claim 7, wherein each of the components are associated with domain extension templates, which are used when creating a partition that includes that component.

11. The method of claim 7, wherein component types are selectable from available component types, and dependent component types are selected automatically by the provisioning framework, using a dependency discovery mechanism.

12. The method of claim 7, wherein the components required to be provisioned for a particular partition include Java Required Files (JRF) components.

13. A non-transitory computer readable storage medium, including instructions stored thereon which when read and executed by one or more computers cause the one or more computers to perform the method comprising:

providing, at the one or more computers, an application server, cloud, or other environment executing thereon, and having a domain for execution of software applications, wherein the application server, cloud, or other environment includes a domain configuration that is used by the system at runtime to define the domain for execution of the software applications, a plurality of partitions of the domain, and one or more resource groups, wherein each partition, of the plurality of partitions, provides an administrative and runtime subdivision of the domain, and includes one or more partition-specific applications or resources;

providing a lifecycle manager that configures components of the application server, cloud, or other environment with partition-specific configurations, wherein each component is associated with a component-specific lifecycle, and wherein during configuration of a particular partition to include one or more components, the lifecycle manager performs lifecycle operations associated with configuration of the one or more components, to configure the one or more components for use with the particular partition; and receiving provisioning requests at the lifecycle manager, that specify the provisioning of a particular partition with particular components, and communicating the provisioning requests to a provisioning framework, for use in provisioning the particular partition with the particular components, for use with applications deployed to the particular partition.

14. The non-transitory computer readable storage medium of claim 13, wherein the method is provided within a cloud environment.

15. The non-transitory computer readable storage medium of claim 13, wherein the method enables one or more partitions to be associated with a tenant, for use by the tenant.

16. The non-transitory computer readable storage medium of claim 13, wherein each of the components are associated with domain extension templates, which are used when creating a partition that includes that component.

17. The non-transitory computer readable storage medium of claim 13, wherein component types are selectable from available component types, and dependent component types are selected automatically by the provisioning framework, using a dependency discovery mechanism.

18. The non-transitory computer readable storage medium of claim 13, wherein the components required to be provisioned for a particular partition include Java Required Files (JRF) components.

\* \* \* \* \*

UNITED STATES PATENT AND TRADEMARK OFFICE
CERTIFICATE OF CORRECTION

PATENT NO. : 11,075,799 B2  
APPLICATION NO. : 16/112233  
DATED : July 27, 2021  
INVENTOR(S) : Nelson Page 1 of 2

It is certified that error appears in the above-identified patent and that said Letters Patent is hereby corrected as shown below:

In the Specification

In Column 1, Line 28, delete "DATABASE AND APPLICATION SERVER" and insert -- SUPPORTING --, therefor.

In Column 6, Line 39, delete "\${CRM DataUsername}." and insert -- \${CRMDataUsername}. --, therefor.

In Column 16, Lines 40-41, delete "getDocument( )method." and insert -- getDocument( ) method. --, therefor.

In Column 17, Line 20, after "Character[ ]" insert -- . --.

In Column 18, Line 8, delete "name> (@" and insert -- name>(@ --, therefor.

In Column 19, Line 62, delete "create( )method" and insert -- create( ) method --, therefor.

In Column 20, Lines 22-23, delete "transform( )method" and insert -- transform( ) method --, therefor.

In Column 20, Line 31, delete "commit( )method" and insert -- commit( ) method --, therefor.

In Column 20, Line 37, delete "rollback( )method" and insert -- rollback( ) method --, therefor.

In Column 20, Line 38, delete "rollback( )methods" and insert -- rollback( ) methods --, therefor.

In Column 20, Line 43, delete "rollback( )method," and insert -- rollback( ) method, --, therefor.

In Column 20, Line 44, delete "rollback( )method," and insert -- rollback( ) method, --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,075,799 B2

In Column 22, Line 7, delete "getConfigurableAttrbutes( )method" and insert -- getConfigurableAttrbutes( ) method --, therefor.

In Column 22, Line 11, after "component" insert -- . --.